US011986857B2

(12) United States Patent
Rajala et al.

(10) Patent No.: US 11,986,857 B2
(45) Date of Patent: May 21, 2024

(54) SCREEN TIGHTENING IN MOBILE MULTI-DECK SCREENING DEVICES

(71) Applicant: Metso Outotec Finland Oy, Tampere (FI)

(72) Inventors: Jouni T. Rajala, Tampere (FI); Timo Leinonen, Tampere (FI)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 17/926,698

(22) PCT Filed: May 24, 2021

(86) PCT No.: PCT/FI2021/050371
§ 371 (c)(1),
(2) Date: Nov. 21, 2022

(87) PCT Pub. No.: WO2021/240057
PCT Pub. Date: Dec. 2, 2021

(65) Prior Publication Data

US 2023/0191456 A1 Jun. 22, 2023

(30) Foreign Application Priority Data

May 25, 2020 (FI) ..................................... 20205524

(51) Int. Cl.
*B07B 1/48* (2006.01)

(52) U.S. Cl.
CPC ............ *B07B 1/48* (2013.01); *B07B 2201/04* (2013.01)

(58) Field of Classification Search
CPC ...... B07B 1/48; B07B 1/005; B07B 2201/004
(Continued)

(56) References Cited

U.S. PATENT DOCUMENTS 2,630,225 A 3/1953 Bye
3,666,277 A 5/1972 Hubach et al.
(Continued)

FOREIGN PATENT DOCUMENTS

AU 1983020841 A1 10/1983
CN 203599068 U 5/2014
(Continued)

OTHER PUBLICATIONS

International Search Report and Written Opinion for PCT Application No. PCT/FI2021/050371 dated Aug. 11, 2021.
(Continued)

*Primary Examiner* — Michael McCullough
*Assistant Examiner* — Jessica L Burkman
(74) *Attorney, Agent, or Firm* — Andrus Intellectual Property Law, LLP

(57) ABSTRACT

A screen medium of a mobile multi-deck screen is tensioned with a tensioner. A tensioning link engages and tensions a screen medium on a side thereof by at least two linear tension rods, when the screen medium side tensioner is installed to the mobile multi-deck screening device. An adjusting member causes for each of the at least two linear tension rods, a linear movement tensioning by the tensioning link the side of the screen medium above the two linear tension rods. A retractor disengages the tensioning link responsively to untightening the at least two tensioning rods. A screen deck, a screen and a mobile multi-deck screening device are also disclosed as well as a method for replacing a screen medium using the tensioner.

14 Claims, 4 Drawing Sheets

(58) Field of Classification Search
USPC .......................................................... 209/405
See application file for complete search history.

(56) References Cited

U.S. PATENT DOCUMENTS

| | | | |
|---|---|---|---|
| 6,669,027 B1 | 12/2003 | Mooney et al. | |
| 7,527,138 B1 | 5/2009 | Kemper | |
| 9,956,592 B2 * | 5/2018 | Newman | B07B 1/485 |
| 11,261,680 B2 * | 3/2022 | Walker | E21B 21/065 |
| 2002/0153289 A1 | 10/2002 | Suter | |
| 2016/0228919 A1 * | 8/2016 | Vallelly | B07B 1/005 |
| 2017/0058621 A1 * | 3/2017 | Bailey | B07B 1/46 |
| 2022/0153289 A1 | 5/2022 | Muramatsu et al. | |

FOREIGN PATENT DOCUMENTS

| | | | |
|---|---|---|---|
| CN | 107754422 | A | 3/2018 |
| CN | 109954669 | A | 7/2019 |
| EP | 0699109 | A1 | 3/1996 |
| EP | 0699109 | B1 | 1/2001 |
| FR | 2142789 | A1 | 2/1973 |
| GB | 588222 | A | 5/1947 |
| WO | 94/26427 | A1 | 11/1994 |

OTHER PUBLICATIONS

Search Report for Finnish Application No. 20205524 dated Nov. 24, 2020.
Office Action for Finnish Application No. 20205524 dated Jan. 10, 2022.

* cited by examiner

SCREEN TIGHTENING IN MOBILE MULTI-DECK SCREENING DEVICES

CROSS-REFERENCE TO RELATED APPLICATIONS

This application is the U.S. national stage application of International Application PCT/FI2021/050371, filed May 24, 2021, which international application was published on Dec. 2, 2021, as International Publication WO 2021/240057 A1 in the English language. The International Application claims priority of Finnish Patent Application No. 20205524 filed May 25, 2020.

TECHNICAL FIELD

The present invention generally relates to screen tightening in mobile multi-deck screening devices.

BACKGROUND

This section illustrates useful background information without admission of any technique described herein representative of the state of the art.

Screens classify material to fractions of different particle size distributions, generally rejecting oversize particles and accepting undersized particles. The screens separate fractions using one or more screen media, such as punch plates or meshes.

Industrial screens typically have abrasion resistant screen media, which are subject to heavy wearing when the screen media is forced to vibrate to enhance the screening. The screen media is typically replaceable to a new one when necessary. Screen medium attachment typically includes a tensioning system with which the screen media is squeezed between frames of the screen. To this end, there are two types of tensioning systems: end tensioning systems and side tensioning systems.

WO9426427A1 discloses an end tensioning system in which tightening bolts are used to tension screen media with tensioning irons at leading and trailing ends of the screen. For screen media between these end media, tensioning screws are moved to the end of the screen body where these screws are easily accessible. Force is relayed from these tensioning screws to the middle screen media with extension rods. In this publication, three screen decks are provided and the screen media in each deck are different not only from one deck to another but also in the flow direction. In each deck, the length of the screen media increases towards an exit end.

Mobile multi-deck screens must balance between conflicting needs of reducing total height of a screening device to allow transport under road and railroad bridges while enabling easy replacement of screening media. It is also desirable to enable screen media replacement via only one side. Modern screen media are also often too heavy for manual handling, e.g., weighing hundreds of kilograms and so that their removal and insertion requires use of lifting machines. It should be easy to engage and disengage the tightening system with the screen media without necessarily accessing gaining entry to within the screen device. For example, looking at FIG. 3 of WO9426427A1, for mounting and removal of the screen media, the tightening screws 30 should be operated using one tool by the nut outside the frame, while the bolt head should be operated using another tool inside the frame. Moreover, it requires manual fitting to align the screen medium with its fixed and bolt movable tensioning irons. On detaching the screen medium, the tensioning irons have to be manually separated from the hook-profiled ends of the screen media inside the screening device if these get stuck at all (by rust, for example).

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect of the invention there is provided a screen medium side tensioner for a mobile multi-deck screening device, comprising:

at least two linear tension rods;

a tensioning link configured responsive to tightening the linear tension rods to engage and tension the screen medium on a side of the screen medium, when the screen medium side tensioner is installed to the mobile multi-deck screening device; and for each of the at least two linear tension rods, an adjusting member configured to cause linear movement of the respective linear tension rod; characterized by:

the tensioning link being configured to tension the side of the screen medium above the two linear tension rods.

The at least two linear tension rods may be threaded. The adjusting member may comprise a nut configured to form, when tightened, an inward effecting force to a frame of the mobile multi-deck screening device so forming an outward effecting force to the linear tension rod. The adjusting member may comprise a bolt head.

The screen medium side tensioner may further comprise a retractor configured, responsive to untightening the at least two linear tension rods, to retract the tensioning link so that the tensioning link disengages the screen medium. The adjusting member may move the tensioning link toward a frame for tightening the engaged screen medium. The retractor may retract or return the tensioning link.

The retractor may comprise a retracting member at each of the at least two linear tension rods. The retracting member may comprise a resilient biasing element. The retracting member may comprise a spring. The retracting member may comprise an inward force relay element configured to induce a retracting force to the tensioning link when the linear tension rod is untightened. The retracting member may comprise a nut on the linear tension rod between the tensioning link and the adjusting member.

The screen medium side tensioner may further comprise a guide configured to guide the linear tension rod. The guide may comprise a bushing. The guide may be formed around the linear tension rod. The guide may be spaced apart of the linear tension rod. The guide may be orientation-locking, e.g. rectangular, elliptical or of other non-circle shape. The screen medium side tensioner may further comprise two guides at respective ends of the tensioning link. The two guides may reside at a distance from the respective ends of the tensioning link that is less than 1%, 5%, 10% or 20% of the length of the tensioning link.

The tensioning link may be configured to tighten an entire side of the screen medium. The tensioning link may be configured to tighten at least partially two different screen media. The tensioning link may be configured to tighten an entire side of one screen medium and at least a portion of a side of another screen medium. Alternatively, the tensioning link may be configured to tighten a portion of a side of the screen medium. The portion may be a half.

According to a second example aspect of the invention there is provided a screen deck of a mobile multi-deck screening device, comprising:

the screen medium side tensioner of the first example aspect; and a frame configured to receive the screen medium side tensioner.

The screening deck may further comprise a screen medium.

The screening deck may comprise a plurality of the screen media. The screening deck may comprise a screen medium side tensioner of the first example aspect for each of the plurality of screen media on at least one side.

The frame may be configured to support a plurality of screen media in one screen deck. The frame may be configured to receive separate screen medium tensioners for each screen media of the screen deck.

The mobile multi-deck screening device may comprise two or more screen medium side tensioners for tensioning one screen medium at corresponding two or more different portions.

One side of the screen medium may be fixedly supported by the frame. An opposite side of the screen medium may be movably supported by the screen medium side tensioner. Alternatively, two opposite sides of the screen medium may be movably supported by separate screen medium side tensioners of the first example aspect.

According to a third example aspect of the invention there is provided a multi-deck screen of a mobile multi-deck screening device, comprising:

one or more of the screen decks of the second example aspect; and a screen body configured to support the one or more screen decks.

The screen body may be configured to support the one or more screen decks in two or more different positions or orientations. The screen body may comprise two or more attaching point sets configured to attach the one or more screen decks at two or more different positions or orientations.

The multi-deck screen may further comprise a vibrator configured to enhance screening.

The body may be configured to receive the screen medium tensioner for N first screen decks when counting from top to bottom. N may equal to the number of the screen decks. N may equal to the number of the screen decks minus one.

The screen media of one screen deck may be of same dimensions. Enabling use of screen media of same dimensions may facilitate logistics and maintenance of the mobile multi-deck screening device.

According to a fourth example aspect of the invention there is provided a mobile multi-deck screening device comprising:

a multi-deck screen of the third example aspect; and a mobile platform configured to support the multi-deck screen.

The mobile multi-deck screening device may comprise a side plate. The side plate may be configured to inhibit leaking of material being screened on the side that is being tightened by the screen medium side tensioner. The side plate may comprise a sealing configured to improve the inhibiting of the leaking of material being screened under the side plate. Alternatively or additionally, the screen medium may comprise a sealing configured to improve the inhibiting of the leaking of material being screened under the side plate. The side plate may be user detachable and attachable. The side plate may be detachable and attachable without tools. The side plate may comprise a detachable attachment mechanism. The detachable attachment mechanism may comprise a magnet.

The side plate may be configured to provide access to the adjusting members. The side plate may comprise one or more gaps or openings for providing the access to the adjusting members.

The side plate may be movable apart from the screen medium to facilitate insertion or removal of the screen medium. The side plate may be configured to facilitate removal of the screen medium in stages so that in one stage, the side plate is in a leak inhibiting configuration and untightening the linear tension rods may separate partly jammed tensioning link from the screen medium. The side plate may resist flexing of the screen medium when the side plate is in the leak inhibiting configuration.

The mobile multi-deck screening device may be self-propelling. The mobile multi-deck screening device may be driven by wheels. The mobile multi-deck screening device may be driven by tracks. Alternatively, the mobile multi-deck screening device may be towable.

The frame may comprise impact tool access openings for directing impacts via a rod to the tensioning link. The impact tool access openings may allow impact detaching a jammed tensioning link from the guides.

According to a fifth example aspect of the invention there is provided a method for replacing a screen medium in a mobile multi-deck screening device, comprising:

retracting a tensioning link on a side of the screen medium by untightening linear tension rods;

disengaging the screen medium by the retracting of the tensioning link;

removing the screen medium when disengaged from the tensioning link;

placing a new screen medium in the multi-deck screening device, which screen medium has an engagement end, so that the engagement end is facing the tensioning link;

tensioning at least two linear tension rods the multi-deck screening device so that the engagement end is engaged and the screen medium is tightened by the tensioning link, characterized by:

tensioning the at least two linear tension rods from outside of the multi-deck screening device.

The method may further comprise guiding the tensioning link to move along a linear track.

The method may further comprise sealing the screen medium responsive to the tightening of the screen medium.

According to a sixth example aspect of the invention there is a mobile multi-deck screening device, comprising:

adjusting members for retracting a tensioning link on a side of a screen medium by untightening at least two linear tension rods;

a retractor for disengaging the screen medium by the retracting of the tensioning link for removing the screen medium when disengaged from the tensioning link;

a platform for receiving a new screen medium equipped with an engagement end;

a guide and the tensioning link configured to cause the tensioning link engaging with and tensioning the new screen medium on tightening the at least two linear tension rod, when the new screen medium has been placed the engagement end facing the tensioning link, characterized by:

the adjusting members being configured to enable tensioning the at least two linear tension rods from outside of the multi-deck screening device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

Figure 1:
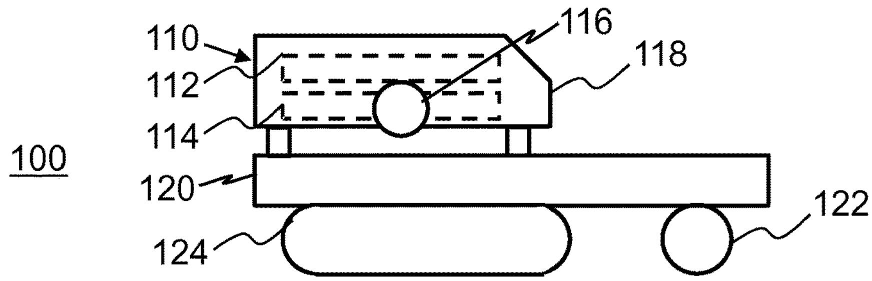
FIG. 1 shows a schematic drawing of a mobile multi-deck screening device.

FIG. 1 shows a schematic drawing of a mobile multi-deck screening plant 100, comprising: a multi-deck screening device 110 with a plurality of screen decks 112, 114; and mobile platform 120 comprising a wheel 122 and a track 124. The multi-deck screening device 110 further comprises a vibrator 116 and a body 118 that supports the screen decks 112, 114 and the vibrator 116.

Figure 2:
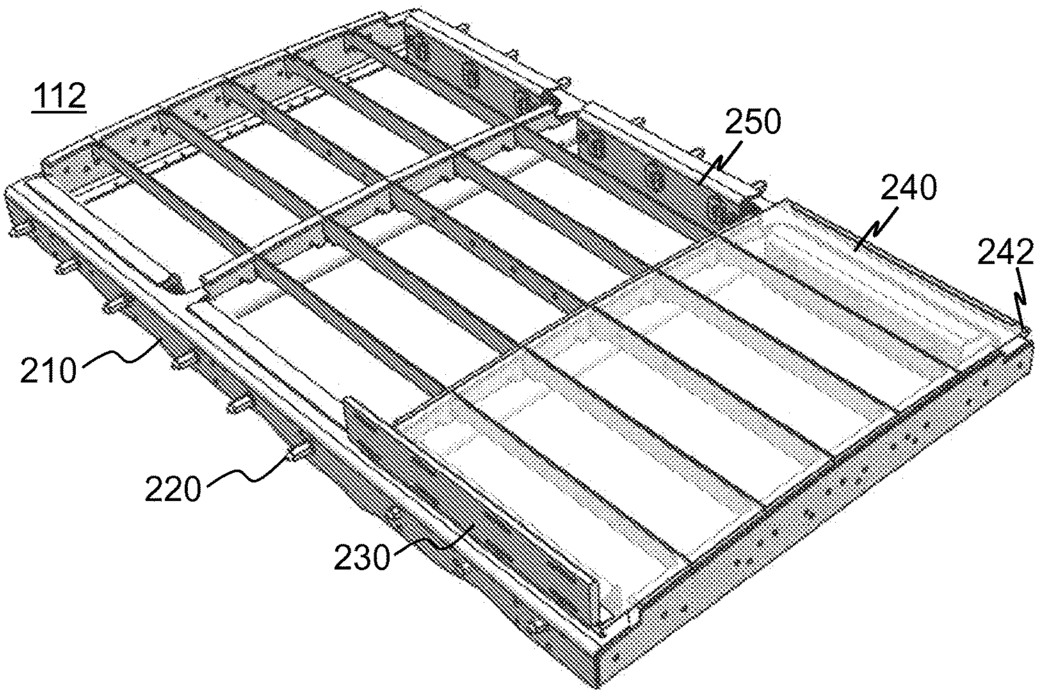
FIG. 2 shows a three-dimensional view of a screen deck with one screen medium.

FIG. 2 shows a three-dimensional view of a screen deck 112 with one screen medium 240. The screen medium 240 comprises on its sides engagement ends 242 that are hook-profiled forms. More than 50 wt-% of the engagement ends 242 may be of steel, aluminum or composite material. FIG. 2 further shows a frame 210; adjusting members 220 for adjusting respective linear tension rods (410 in FIG. 4), here nuts; a side plate 230; and an tensioning link 250 for relaying force from the plurality of tension rods 410 to the engagement ends 242 at and between the tension rods 410.

Figure 3:
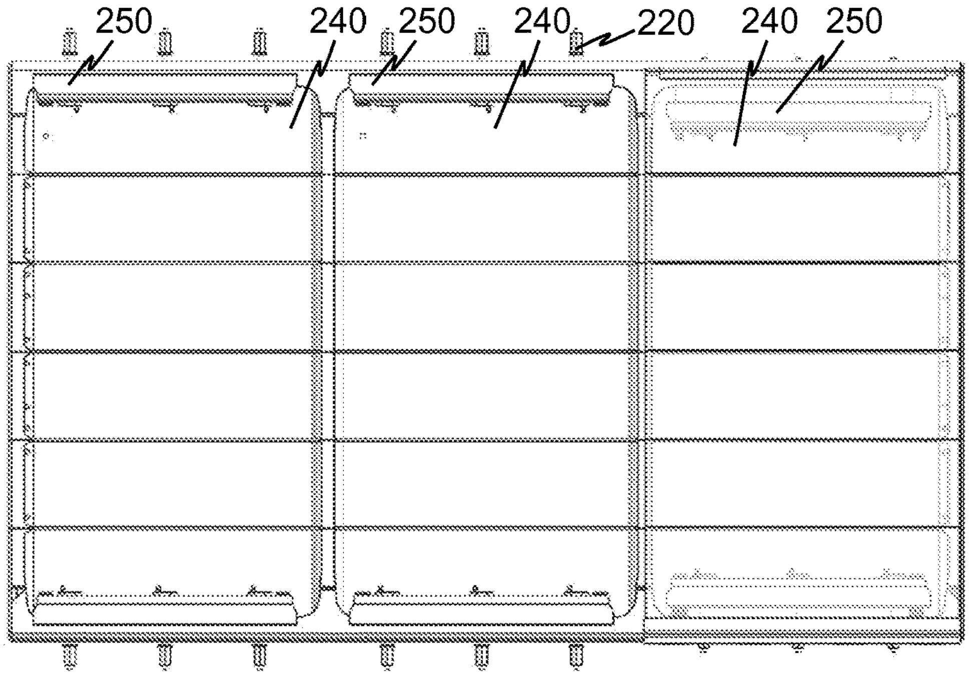
FIG. 3 shows a top view of a screen deck with three screen media.

FIG. 3 shows a top view of the screen deck 112 with three screen media 240. It appears in FIG. 3 how a plurality of screen media 240 (here three) are mounted adjacent to each other to cover the screen deck 112. The gaps between adjacent ones of the screen media 240 are blocked by gap strips (not shown) so as to avoid leakage of oversized mineral material between the adjacent screen media 240. These gap strips may extend substantially as long as the screen media 240 so that they can also seal a gap between the adjacent screen media and the side plates 230 as will be better understood from FIG. 5.

Figure 4:
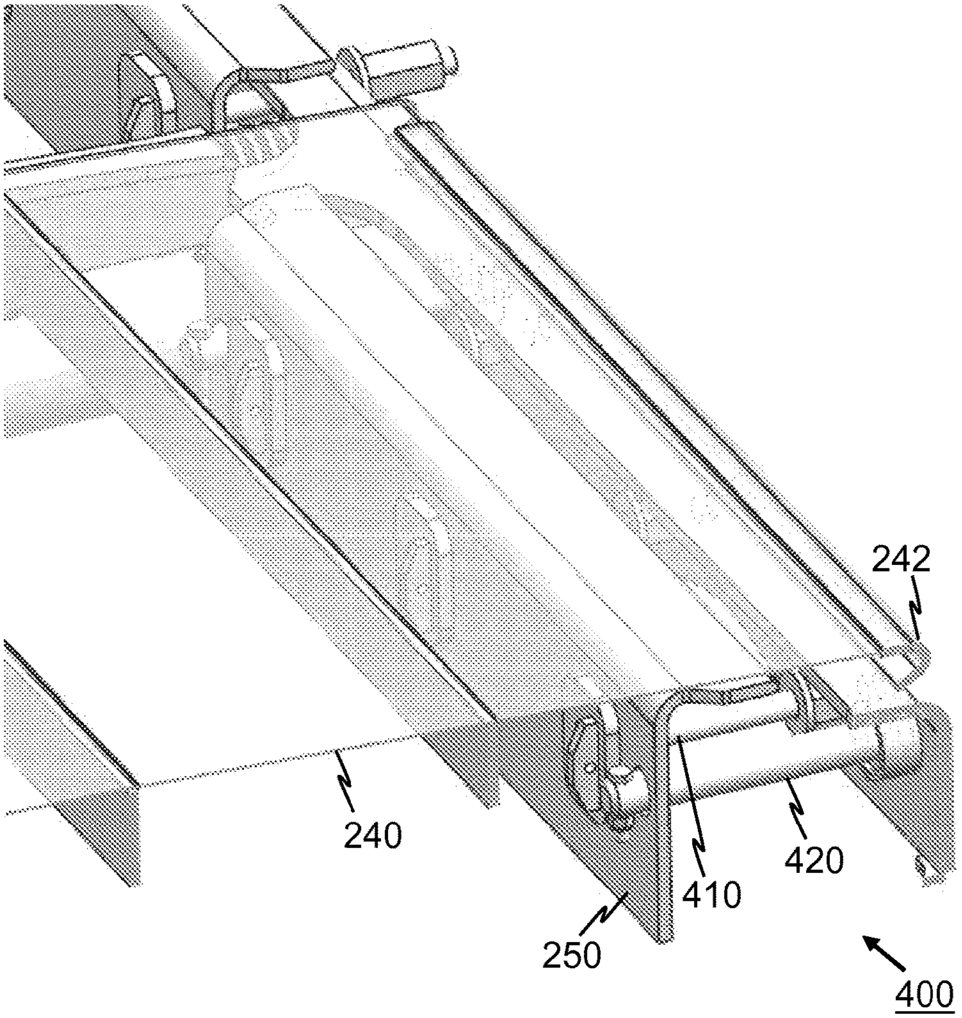
FIG. 4 shows a three-dimensional view of some details of a screen medium side tensioner.

FIG. 4 shows a three-dimensional view of some details of a screen medium side tensioner 400. The screen medium side tensioner 400 comprises the adjustment member 220; the linear tension rods 410, shown here without a spring 510 (FIG. 5) for moving the tensioning link 250 outward or inward for tightening or untightening the screen medium 240; a guide 420 for guiding the tensioning link to move along a substantially linear track so that the tensioning link can be held in position for engaging with the engagement end 242 of the screen medium, when a screen medium is being installed.

Figure 5:
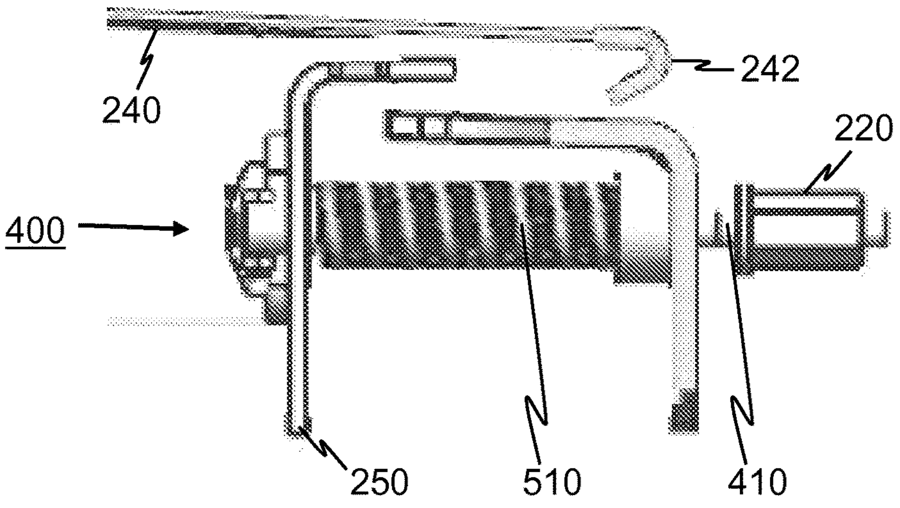
FIG. 5 shows another three-dimensional view of some details of the screen medium side tensioner.

FIG. 5 shows another three-dimensional view of some details of the screen medium side tensioner 400, including the spring 510 around the linear tension rod 410.

Figure 6:
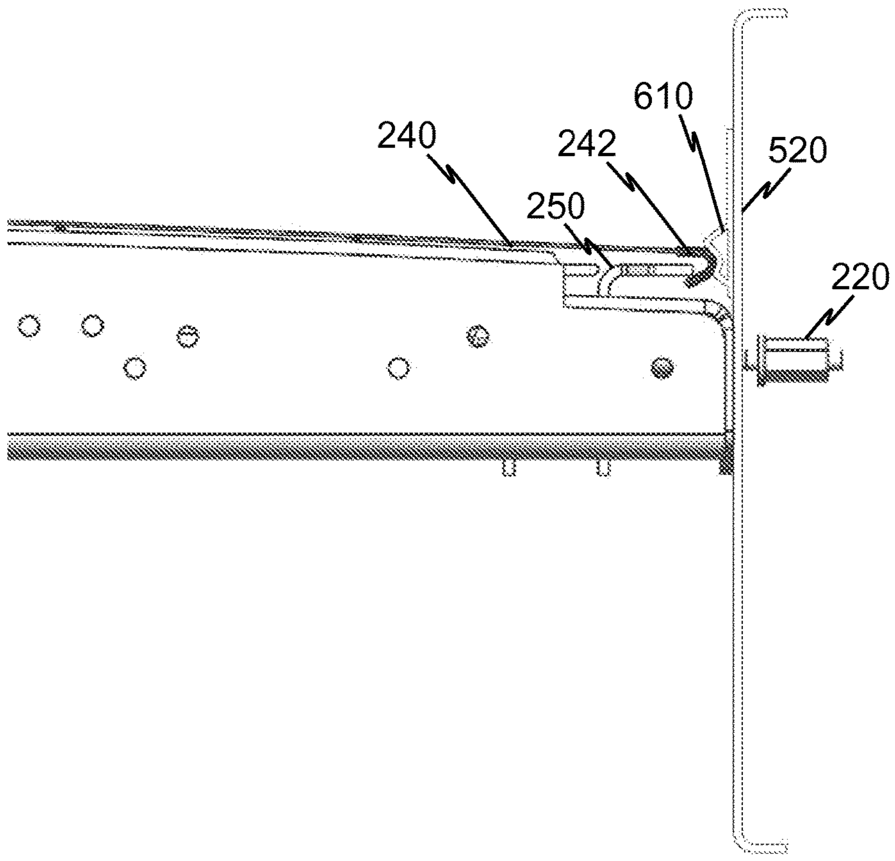
FIG. 6 shows a sealing of an example.

FIG. 6 shows a sealing 610 of an example. The sealing 610 is attached to a side plate 520 such that the engagement end 242 depresses the sealing 610 when tightened. Also the gap strips discussed in connection with FIG. 3 are sealed by the sealing 610.

In FIG. 6, a D-seal is used as the sealing 610. Other forms, such as B-seal, are also usable, as well as filled compressible seals such as foam seals. It is also perceivable to furnishing a relatively stiff sealing that basically corresponds to that of FIG. 6 but lacks the bottom part that further supports the sealing 610 to the side plate 520.

Figure 7:
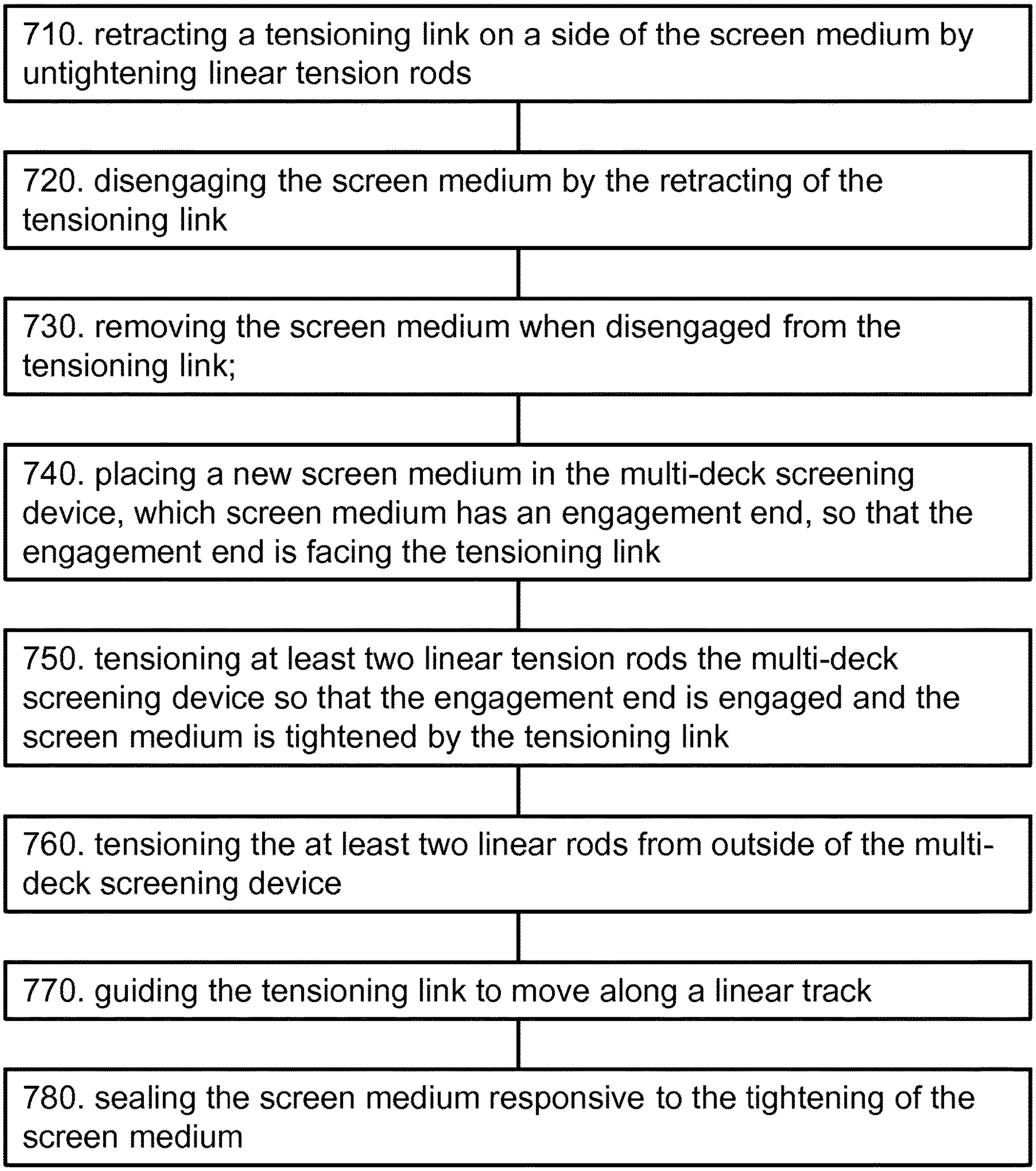
FIG. 7 shows a flow chart of a screen medium tightening process.

FIG. 7 shows a flow chart of a screen medium tightening process 700 for replacing a screen medium in a mobile multi-deck screening device, comprising:

710. retracting a tensioning link on a side of the screen medium by untightening linear tension rods;

720. disengaging the screen medium by the retracting of the tensioning link;

730. removing the screen medium when disengaged from the tensioning link;

740. placing a new screen medium in the multi-deck screening device, which screen medium has an engagement end, so that the engagement end is facing the tensioning link;

750. tensioning at least two linear tension rods the multi-deck screening device so that the engagement end is engaged and the screen medium is tightened by the tensioning link;

760. tensioning the at least two linear tension rods from outside of the multi-deck screening device.

The process 700 further comprises in an example one or more of:

770. guiding the tensioning link to move along a linear track;

780. sealing the screen medium responsive to the tightening of the screen medium.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A screen medium side tensioner for a mobile multi-deck screening device, comprising:

at least two linear tension rods each movable along a linear axis;

a tensioning link configured responsive to tightening the linear tension rods to move in a direction parallel to the linear axis to engage and tension a screen medium on a side of the screen medium, when the screen medium side tensioner is installed to the mobile multi-deck screening device; and for each of the at least two linear tension rods, an adjusting member configured to cause linear movement of the respective linear tension rod along the linear axis;

the tensioning link being configured to tension the side of the screen medium that is located above the at least two linear tension rods, wherein the screen medium side tensioner further comprising a retractor configured, responsive to untightening the at least two linear tension rods, to retract the tensioning link so that the tensioning link disengages the screen medium.

2. The screen medium side tensioner of claim 1, further comprising a guide configured to guide the movement of the tensioning link along the linear axis.

3. The screen medium side tensioner of claim 1, wherein the retractor is integrated with the at least two linear tension rods.

4. The screen medium side tensioner of claim 1, wherein the tensioning link is configured to tighten an entire side of the screen medium.

5. The screen medium side tensioner of claim 1, wherein the tensioning link is configured to tighten a portion of the screen medium.

6. A screen deck of a mobile multi-deck screening device, comprising:

a screen medium side tensioner comprising:

at least two linear tension rods each movable along a linear axis;

a tensioning link configured responsive to tightening the linear tension rods to move in a direction parallel to the linear axis to engage and tension a screen medium on a side of the screen medium, when the screen medium side tensioner is installed to the mobile multi-deck screening device; and for each of the at least two linear tension rods, an adjusting member configured to cause linear movement of the respective linear tension rod along the linear axis;

the tensioning link being configured to tension the side of the screen medium that is located above the at least two linear tension rods, wherein the screen medium side tensioner further comprising a retractor configured, responsive to untightening the at least two linear tension rods, to retract the tensioning link so that the tensioning link disengages the screen medium; and a frame configured to receive the screen medium side tensioner.

7. The screen deck of claim 6, wherein the frame is configured to movably support two opposite sides of the screen medium by two screen medium side tensioners.

8. A multi-deck screen of a mobile multi-deck screening device, comprising:

one or more of the screen decks of claim 7; and a screen body configured to support the one or more screen decks.

9. The multi-deck screen of claim 8, wherein the screen body is configured to support the one or more screen decks in two or more different positions or orientations.

10. A mobile multi-deck screening device, comprising:

the multi-deck screen of claim 8; and a mobile platform configured to support the multi-deck screen.

11. The mobile multi-deck screening device of claim 10, further comprising a side plate configured to close from the material being screened at least a portion of a side of the multi-deck screen.

12. The mobile multi-deck screening device of claim 11, wherein the side plate further comprises a detachable attachment mechanism configured to allow detaching and attaching the side plate without tools.

13. The mobile multi-deck screening device of claim 11, wherein the side plate further comprises a sealing configured to inhibit leaking of material being screened under the side plate, wherein the sealing is configured to abut an edge of the screen medium.

14. A method for replacing a screen medium in a mobile multi-deck screening device, comprising:

retracting a tensioning link on a side of the screen medium by untightening at least two linear tension rods that are located below the screen medium;

disengaging the screen medium by the retracting of the tensioning link in response to untightening the at least two linear tension rods;

removing the screen medium when disengaged from the tensioning link;

placing a new screen medium in the multi-deck screening device, which screen medium has an engagement end, so that the engagement end is facing the tensioning link;

tensioning the at least two linear tension rods of the multi-deck screening device so that the at least two linear tension rods move along a linear axis such that the engagement end of the new screen medium is engaged by the tensioning link and the screen medium is tightened by the movement of the tensioning link in a direction parallel to the linear axis;

tensioning the at least two linear tension rods from outside of the multi-deck screening device; and performing disengaging the screen medium by the retracting of the tensioning link using a retractor in response to untightening at least two linear tension rods.

* * * * *